(12) United States Patent
Shoji et al.

(10) Patent No.: US 11,237,136 B2
(45) Date of Patent: Feb. 1, 2022

(54) METHOD FOR INSTALLING PROBES, AND METHOD FOR DRIVING TRANSMISSION PROBE

(71) Applicant: Nippon Telegraph and Telephone Corporation, Tokyo (JP)

(72) Inventors: Masanari Shoji, Tokyo (JP); Soichi Oka, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 50 days.

(21) Appl. No.: 16/962,182

(22) PCT Filed: Feb. 1, 2019

(86) PCT No.: PCT/JP2019/003598
§ 371 (c)(1),
(2) Date: Jul. 14, 2020

(87) PCT Pub. No.: WO2019/151474
PCT Pub. Date: Aug. 8, 2019

(65) Prior Publication Data
US 2021/0364477 A1    Nov. 25, 2021

(30) Foreign Application Priority Data
Feb. 2, 2018   (JP) .............................. JP2018-017186

(51) Int. Cl.
*G01N 29/04*   (2006.01)
*G01N 29/24*   (2006.01)
*G01N 29/07*   (2006.01)

(52) U.S. Cl.
CPC ....... *G01N 29/2437* (2013.01); *G01N 29/041* (2013.01); *G01N 29/075* (2013.01); *G01N 2291/011* (2013.01)

(58) Field of Classification Search
CPC ............. G01N 29/2437; G01N 29/075; G01N 2291/011
See application file for complete search history.

(56) References Cited

U.S. PATENT DOCUMENTS

| | | | |
|---|---|---|---|
| 9,952,183 B2* | 4/2018 | Zhang ................ | G01N 29/2487 |
| 2011/0087256 A1* | 4/2011 | Wiener .............. | A61B 18/1206 606/169 |
| 2012/0109540 A1* | 5/2012 | Torichigai ........... | G01N 29/041 702/39 |

OTHER PUBLICATIONS

Shumpel Kameyama et al., *Ultrasonic Test Instrument Using Guided Wave*, Feature Article Flaw Detection using Guided Waves, Nondestructive Inspection, vol. 52, No. 12, 2003, pp. 272-678.

(Continued)

*Primary Examiner* — Suman K Nath
(74) *Attorney, Agent, or Firm* — Workman Nydegger

(57) ABSTRACT

A transmission probe for transmitting guided waves propagating in the longitudinal direction of a long member and a reception probe for receiving guided waves derived from the guided waves reflected from a predetermined portion of the long member are set on the long member. The guided waves received by the reception probe include a guided wave serving as a second signal that is noise of a desired first signal. The guided wave serving as the second signal having nodes in a circumferential direction distribution of displacement in a specific direction in the circumferential surface of the long member, and the guided waves transmitted by the transmission probe are formed such that the displacement of the guided wave serving as the second signal in the specific direction becomes zero at a specific circumferential surface position of the long member. A probe setting method comprising the steps of: setting the transmission probe for transmitting the guided waves on the circumferential surface of the long member; and setting the reception probe at a position at which the displacement of the guided wave (Continued)

serving as the second signal in the specific direction becomes zero on the circumferential surface of the long member.

8 Claims, 7 Drawing Sheets

(56) References Cited

OTHER PUBLICATIONS

Yoshiaki Nagashima et al., *Pipe Thinning Inspection Technique Using Guided Wave*, Piping Technology, Jun. 2008, pp. 19-24.
Takahiro Hayashi et al., *Extraction of a Non-Axisymmetric Mode of Guided Waves*, Graduate Japan Nondestruction Inspection Association, vol. 53, No. 4, 2004, pp. 223-229.
International Search Report and Written Opinion dated Apr. 23, 2019, issued in PCT Application No. PCT/JP2019/003598, filed Feb. 1, 2019.

* cited by examiner

METHOD FOR INSTALLING PROBES, AND METHOD FOR DRIVING TRANSMISSION PROBE

TECHNICAL FIELD

The present invention relates to a probe setting method for setting a transmission probe for transmitting guided waves propagating in the longitudinal direction of a long member and a reception probe for receiving guided waves, and a method for driving a transmission probe.

BACKGROUND ART

Conventionally, when long members such as pipelines, component members of various pipes and various machines, and construction members have defective portions at which cross sectional areas, cross-sectional shapes and physical characteristics have changed due to cracking, abrasion, corrosion, strain, material property changes, and the like, an elastic wave pulse reflection method has been proposed as a means for efficiently detecting and inspecting portions at which such defects have been generated (refer to NPL 1 to 3, for example). The elastic wave pulse reflection method includes transmitting elastic waves (generally, guided waves in an ultrasonic frequency region) propagating in an axial direction of a long member and receiving elastic waves (hereinafter also represented as "echo waves") reflected from a part at which a shape or the like has changed. A distance to a defect is evaluated on the basis of a time from transmission of elastic waves for detecting the presence or absence, the position and a degree of a defect, and the like to reception of reflected echo waves, and a wave propagation velocity. In addition, a degree of a defect is evaluated by amplitudes and durations of echo waves.

Elastic waves propagating in the longitudinal direction of a long member are generally called guided waves. A multimode property in which multiple modes of waves are present and dispersibility in which there is frequency dependency on the velocity of sound are known as characteristics of the guided waves. The elastic wave pulse reflection method uses a specific one or plurality of modes from among a plurality of modes of guided waves which can propagate through a long member that is a target.

CITATION LIST

Non Patent Literature

[NPL 1] Kameyama Shunpei et al., *Gaido-ha Tansho Shistem* (Guided wave flaw detection system), (Incorporated Association) The Japanese Society for Non-Destructive Inspection, Non-Destructive Inspection, Vol. 52, No. 12, pp. 672-678, issued on 1 Dec. 2003
[NPL 2] Nagashima Yoshiaki et al., *Gaido-ha wo Mochiita Haikan Gen-niku Kensa Gijutsu* (Piping thickness Reduction Inspection Technology using Guided Waves), Japanese Industrial Publication Co., Ltd., Piping Technology, pp. 19-24, June issue, 2008
[NPL 3] Hayashi Takahiro et al., *Gaido-ha Hitaishojiku Modo no Chushutsu* (Extraction of Guided Wave non-Axial Symmetry Mode), (Incorporated Association) Japanese Society for Non-Destructive Inspection, Non-Destructive Inspection, Vol. 53, No. 4, pp. 223-229, issued on April, 2004.

SUMMARY OF THE INVENTION

Technical Problem

Although the elastic wave pulse reflection method uses a specific one or plurality of modes from among a plurality of modes of guided waves, there are cases in which there is a mode that is not used in the elastic wave pulse reflection method from among the plurality of modes of guided waves. The presence of an unused mode in the elastic wave pulse reflection method may affect echo-wave received signals and decrease an SN ratio. In addition, even when only a desired specific mode can be generated and transmitted when guided waves are transmitted, an unused mode may be generated (mode conversion) in a process of scattering or reflection incurred in propagation of waves, which may affect echo-wave received signals and decrease an SN ratio.

Accordingly, an object of the present invention is to provide a probe setting method and a method for driving a transmission probe for improving an SN ratio in reception of guided waves.

Means for Solving the Problem

To accomplish the aforementioned object, a first feature of the present invention relates to a probe setting method for setting, on a long member, a transmission probe for transmitting guided waves propagating in the longitudinal direction of the long member and a reception probe for receiving guided waves derived from the guided waves reflected from a predetermined portion of the long member. In the probe setting method according to the first feature of the present invention, the guided waves received by the reception probe include a guided wave serving as a desired first signal and a guided wave serving as a second signal that is noise of the first signal, the guided wave serving as the second signal has nodes in a circumferential direction distribution of displacement in a specific direction in the circumferential surface of the long member, and the guided waves transmitted by the transmission probe are formed such that the displacement of the guided wave serving as the second signal in the specific direction becomes zero at a specific circumferential surface position of the long member. The probe setting method according to the first feature of the present invention includes a step of setting the transmission probe for transmitting the guided waves on the circumferential surface of the long member, and a step of setting the reception probe at a position at which the displacement of the guided wave serving as the second signal in the specific direction becomes zero on the circumferential surface of the long member.

Here, the transmission probe may apply, to the circumferential surface of the long member, displacement or displacement vibration in a direction parallel to a plane including the position of the transmission probe and the central axis of the long member.

Further, the long member may be formed to be axially symmetrical with respect to the central axis in the lengthwise direction and have a plurality of cross sections that are formed perpendicularly to the central axis and have the same shape.

Further, the reception probe may be set at the specific circumferential surface position at which the displacement of the guided wave serving as the second signal in the specific direction becomes zero, and the specific direction may be a direction parallel to a plane passing through the specific circumferential surface position and the central axis of the long member.

Further, an angle θ formed by a straight line that passes through the position at which the transmission probe is set and perpendicularly intersects the central axis of the long member in the lengthwise direction and a straight line that passes through the position at which the reception probe is set and perpendicularly intersects the central axis of the long member may be specified by Equation (1).

Formula 1

$$\theta = \frac{1}{n}\left(\frac{\pi}{2} + l\pi\right)$$ Equation (1)

Further, the transmission probe may include a plurality of probes, the plurality of probes may be disposed in a planar symmetrical positional relation with respect to at least one plane passing through the central axis of the long member in the lengthwise direction, and the plurality of transmission probes may be driven to apply displacement or displacement vibration in planar symmetry with respect to the plane to the long member.

A second feature of the present invention relates to a method for driving a transmission probe set on the circumferential surface of a long member. In the method for driving a transmission probe according to the second feature of the present invention, a transmission probe for transmitting guided waves propagating in the longitudinal direction of the long member and a reception probe for receiving guided waves derived from the guided waves reflected from a predetermined portion of the long member are set on the circumferential surface of the long member, the guided waves received by the reception probe include a guided wave serving as a desired first signal and a guided wave serving as a second signal that is noise of the first signal, the guided wave serving as the second signal has nodes in a circumferential direction distribution of displacement in a specific direction in the circumferential surface of the long member, the guided waves transmitted by the transmission probe are formed such that the displacement of the guided wave serving as the second signal in the specific direction becomes zero at a specific circumferential surface position of the long member, and the reception probe is set at a position at which the displacement of the guided wave serving as the second signal in the specific direction becomes zero on the circumferential surface of the long member. The method for driving a transmission probe according to the second feature of the present invention includes a step of driving the transmission probe such that the transmission probe applies, to the circumferential surface of the long member, displacement or displacement vibration in a direction parallel to a plane including the position of the transmission probe and the central axis of the long member.

A third feature of the present invention relates to a method for driving a transmission probe set on the circumferential surface of a long member. In the method for driving a transmission probe according to the third feature of the present invention, a transmission probe for transmitting guided waves propagating in the longitudinal direction of the long member and a reception probe for receiving guided waves derived from the guided waves reflected from a predetermined portion of the long member are set on the circumferential surface of the long member, the guided waves received by the reception probe include a guided wave serving as a desired first signal and a guided wave serving as a second signal that is noise of the first signal, the guided wave serving as the second signal has nodes in a circumferential direction distribution of displacement in a specific direction in the circumferential surface of the long member, the guided waves transmitted by the transmission probe are formed such that the displacement of the guided wave serving as the second signal in the specific direction becomes zero at a specific circumferential surface position of the long member, the transmission probe includes a plurality of probes, the plurality of probes being disposed in a planar symmetrical positional relation with respect to at least one plane passing through the central axis of the long member in the lengthwise direction, and the reception probe is set at a position at which the displacement of the guided wave serving as the second signal in the specific direction becomes zero on the circumferential surface of the long member. The method for driving a transmission probe according to the third feature of the present invention includes a step of driving the plurality of transmission probes such that the transmission probes apply displacement or displacement vibration in planar symmetry with respect to the plane to the long member.

Effects of the Invention

According to the present invention, it is possible to provide a probe setting method and a method for driving a transmission probe for improving an SN ratio in reception of guided waves.

BRIEF DESCRIPTION OF DRAWINGS

FIG. 1 is a diagram describing a method for setting a transmission probe and a reception probe according to an embodiment of the present invention.

FIG. 4 is a diagram describing a method for setting a transmission probe and a reception probe in application example 1.

FIG. 5 is a diagram describing a method for setting a transmission probe and a reception probe in application examples 2 and 3.

FIG. 6 is a diagram describing a method for setting a transmission probe and a reception probe in application example 4.

DESCRIPTION OF EMBODIMENTS

Next, an embodiment of the present invention will be described with reference to the drawings. In the following drawings, the same or similar elements are designated by the same or similar signs.

Figure 2A:
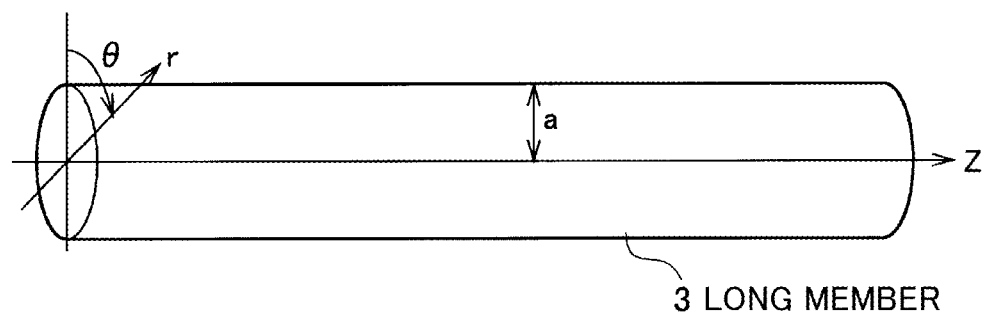
FIG. 2(a) is a diagram describing a coordinate system along a lengthwise direction of a long member according to an embodiment of the present invention.
Figure 2B:
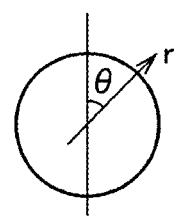
FIG. 2(b) is a diagram describing a coordinate system at an end view of the long member.

Embodiments of the present invention will be described using a cylindrical coordinate system shown in FIG. 2. As shown in FIG. 2(a), a central axis in the lengthwise direction of a long member 3 is set to a z axis. As shown in FIG. 2(b), a radius is set to r and an angle formed between a predetermined position and the radius is set to θ. In addition, the diameter of the cross section of the long member (the diameter of a columnar solid rod or the outer diameter of a cylindrical pipe) is represented as 2a in an embodiment of the present invention.

Probe Setting Method

A probe setting method for setting, on the long member 3, a transmission probe 1 for transmitting guided waves propagating in the longitudinal direction of the long member 3 and a reception probe 2 for receiving guided waves reflected from a predetermined portion at which a defect has been generated in the long member 3 in an embodiment of the present invention will be described with reference to FIG. 1. The transmission probe 1 for transmitting guided waves and the reception probe 2 for receiving guided waves are set such that they come into contact with the circumferential surface of the long member 3.

The transmission probe 1 is set on the circumferential surface of the long member 3 and transmits guided waves. As a method for transmitting guided waves in the long member 3, a method of using a piezoelectric element probe (array) as a probe (transducer), a method of using an electromagnetic acoustic transducer (EMAT), a method of using a magnetostrictive sensor, a laser acoustic method using a laser, and the like are known. In embodiments of the present invention, any method of transmitting guided waves can be used.

The reception probe 2 is set on the circumferential surface of the long member 3 and receives guided waves. As a method for receiving guided waves in the long member 3, a method of using a piezoelectric element probe, a method of using an electromagnetic acoustic transducer, a method of using a magnetostrictive sensor, a laser acoustic method, and the like are known. In embodiments of the present invention, any method of receiving guided waves can be used.

The reception probe 2 receives guided waves (which may be referred to as echo waves) generated as a result of transmission from the transmission probe 1 and reflection at a predetermined portion of the long member 3. Further, there are cases in which the reception probe 2 receives guided waves which are transmitted from the transmission probe 1 in the longitudinal direction of the axis of the long member 3 and, subjected to processes such as reflection and scattering, and arrive at the reception probe 2 in addition to guided waves that are transmitted from the transmission probe 1 and directly arrive at the reception probe 2.

Guided waves transmitted by the transmission probe 1 are waves used to detect changes in the material properties and changes in the shape of the long member 3. Guided waves received by the reception probe 2 include a guided wave serving as a desired first signal and a guided wave serving as a second signal that is noise of the first signal. The guided wave serving as the second signal has nodes in a circumferential direction distribution of displacement in a specific direction in the circumferential surface of the long member 3. A distribution in the circumferential direction is a distribution of positions on the circumferential surface in the cross section perpendicular to the central axis of the long member 3. Guided waves transmitted by the transmission probe 1 are formed such that displacement of the guided wave serving as the second signal in a specific direction becomes zero at a specific circumferential surface position of the long member 3. Here, the specific direction is a direction parallel to a plane that passes through the specific circumferential surface position and the central axis of the long member 3. In other words, the specific direction is a direction represented by a vector having a θ component of zero in the cylindrical coordinate system shown in FIG. 2.

The second signal in an embodiment of the present invention is a signal of a guided wave F mode. Although the first signal may be any of a guided wave L mode and F mode, a case in which the first signal is an L mode in which a distribution of displacement is axially symmetrical with respect to the central axis in the lengthwise direction and there is no node in a circumferential direction distribution is described in an embodiment of the present invention. The first signal is used to detect changes in the material properties or shape of the long member 3 and the second signal serves as noise with respect to the first signal.

Since guided waves received by the reception probe 2 can generally include the guided wave forming the desired first signal and the guided wave serving as the second signal that is noise of the first signal, an embodiment of the present invention proposes methods for setting and driving the transmission probe 1 and setting the reception probe 2 such that the influence of the second signal serving as noise decreases in detection of the first signal through the reception probe 2.

The long member 3 is formed to be symmetrical with respect to the central axis in the lengthwise direction (longitudinal direction) and has a plurality of cross sections that are formed perpendicularly to the central axis and have the same shape. The long member 3 is a columnar solid rod, a cylindrical pipe, or the like.

When the transmission probe 1 and the reception probe 2 are set on the circumferential surface of this long member 3, a probe setting method according to an embodiment of the present invention includes a step of setting the transmission probe 1 for transmitting guided waves on the circumferential surface of the long member 3 and a step of setting the reception probe 2 at a position of the circumferential surface of the long member 3 at which displacement of the guided wave serving as the second signal in a specific direction becomes zero. Here, the transmission probe 1 applies, to the circumferential surface of the long member 3, displacement or displacement vibration in a direction parallel to a plane including the position of the transmission probe 1 and the central axis of the long member 3. The direction parallel to the plane including the position of the transmission probe 1 and the central axis of the long member 3 is the direction represented by a vector having a θ component of zero in the cylindrical coordinate system shown in FIG. 2.

In an embodiment of the present invention, the transmission probe 1 transmits guided waves and the guided waves propagate in the axial direction of the long member 3. When there is a defective portion having a change in a cross-sectional area, a cross-sectional shape or a physical characteristic due to cracking, abrasion, corrosion, strain, material property change, or the like in the long member 3 in the direction in which the guided waves propagate, guided waves are reflected at the defective portion to generate echo waves. The reception probe 2 identifies information about the presence and location of the defect by detecting the echo waves.

Meanwhile, although not shown, a measurement device which performs transmission of guided waves through the transmission probe 1 and reception and analysis of guided waves through the reception probe 2 may be included. The measurement device includes a CPU, a memory, and an interface of the transmission probe 1 and the reception probe 2. The measurement device transmits guided waves from the transmission probe 1 and analyzes echo waves received through the reception probe 2. The measurement device evaluates a distance between a probe position and a defect on the basis of a time from when guided waves for detecting the presence, position, degree and the like of a defect are transmitted to when reflected echo waves are received and a wave propagation velocity. In addition, the measurement device evaluates a degree and a state of the defect using amplitudes and durations of the echo waves.

In an embodiment of the present invention, the reception probe is set at a position on the circumferential surface at which displacement of the guided wave serving as the second signal in a specific direction becomes zero. Here, the specific direction is a direction parallel to a plane that passes through the position at which the reception probe 2 is set and the central axis (z axis) of the long member 3. The direction parallel to the plane that passes through the circumferential surface position of the long member 3 and the central axis of the long member 3 is a direction represented by a vector having a θ component of zero in the cylindrical coordinate system shown in FIG. 2. More specifically, an angle θ formed by a straight line that passes through the position at which the transmission probe 1 is set and perpendicularly intersects the central axis (z axis) of the long member 3 in the lengthwise direction and a straight line that passes through the position at which the reception probe 2 is set and perpendicularly intersects the central axis (z axis) in the lengthwise direction is specified by Equation (1).

Formula 1

$$\theta = \frac{1}{n}\left(\frac{\pi}{2} + l\pi\right) \quad \text{Equation (1)}$$

Equation (1) represents the θ coordinate of the reception probe 2 when the θ coordinate of the transmission probe 1 is set to 0.

Figure 1A:
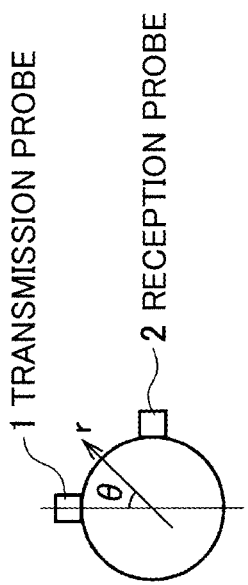
FIG. 1(a) is a cross-sectional view cut perpendicularly to a central axis in the lengthwise direction of a long member.
Figure 1B:
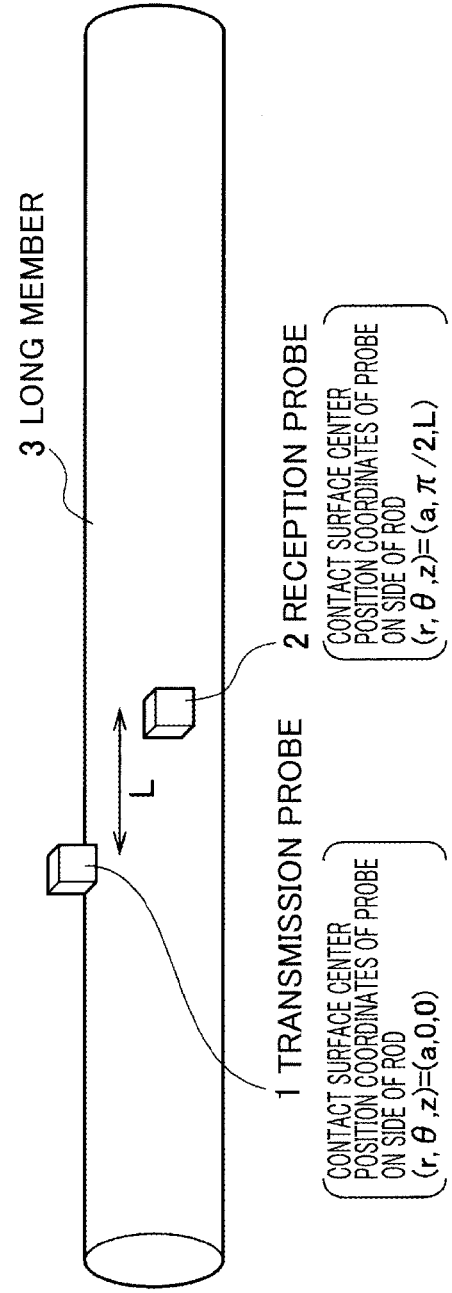
FIG. 1(b) is a perspective view of the long member.

When the transmission probe 1 is arranged at a position of (r, θ, z)=(a, 0, 0) as shown in FIG. 1, the reception probe 2 may be arranged at a position of (r, θ, z)=(a, π/2, L), for example. Accordingly, the reception probe 2 can selectively detect displacement of the guided wave forming the desired first signal.

When n=1 and l=0 in Equation (1), θ is π/2 (90°). The probe setting method in this case will be described in detail.

In FIG. 1, the transmission probe 1 is set at a portion of the circumferential surface of the long member 3. Further, the reception probe 2 is set at a position separated from the position at which the transmission probe 1 is set by a distance L in the z direction (axial direction) and deviates from the transmission probe 1 by π/2 (90°) in the circumferential direction. In the example shown in FIG. 1, the long member 3 is a columnar solid rod made of steel.

Figure 3A:
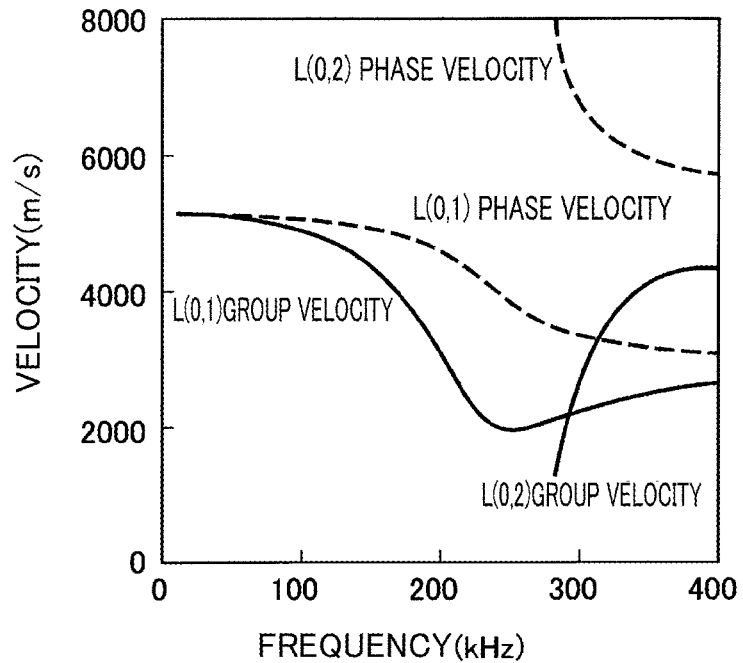
FIG. 3(a) is a diagram describing dispersion curves of phase velocities and group velocities of an L mode of guided waves with respect to a predetermined long member.
Figure 3B:
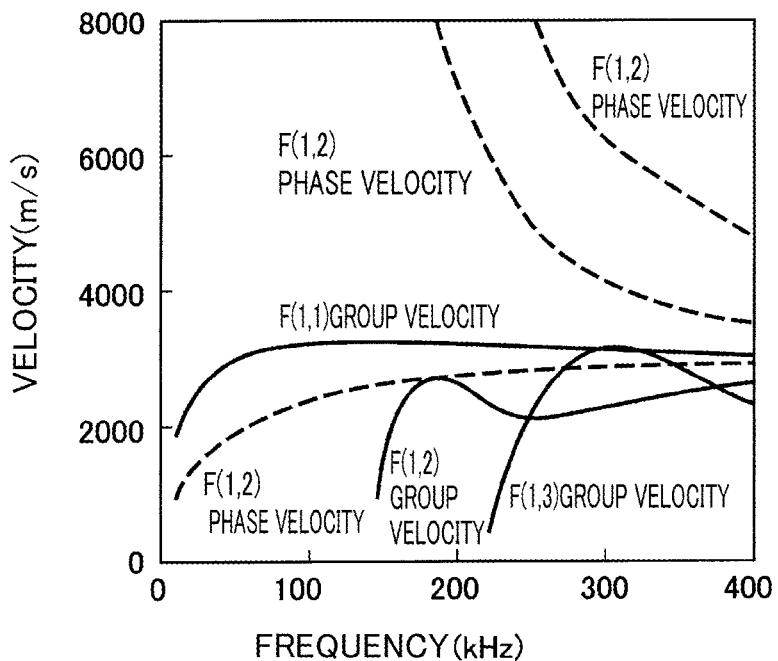
FIG. 3(b) is a diagram describing dispersion curves of phase velocities and group velocities of an F mode of guided waves with respect to a predetermined long member.

Modes of guided waves which can be present in the long member 3 and characteristics thereof are determined by the shape and physical material properties of the long member 3 and the environment where the long member 3 is placed. For example, the modes of guided waves that can be present in the long member 3 (columnar rod made of steel) with a diameter of 13 mm placed in the air or in a vacuum and the characteristics thereof may be specified by dispersion curves of phase velocities and group velocities shown in FIG. 3. FIGS. 3(*a*) and (*b*) show dispersion curves of phase velocities and group velocities of a guided wave L mode and F mode in the long member 3 (columnar rod made of steel) with a diameter of 13 mm in a vacuum. The dispersion curves are calculated under the conditions of a bulk wave longitudinal wave acoustic velocity of 5900 m/s, a bulk wave transversal wave acoustic velocity of 3200 m/s, and a steel density of 7860 kg/m$^3$.

In an embodiment of the present invention, a case in which the transmission probe 1 applies displacement vibration (displacement vibration in a direction in which the θ component is zero) at a predetermined frequency equal to or lower than about 120 kHz in a direction parallel to a plane that passes through the position of the transmission probe 1 and the z axis to a contact position of the circumferential surface of the long member 3 to generate guided waves and transmits the guided waves will be described. In this case, as can be ascertained from FIGS. 3(*a*) and (*b*), two types of waves of an L(0,1) mode and an F(1,1) mode are generated. The two types of modes of the L(0,1) mode and the F(1,1) are transmitted in the longitudinal direction (±z direction) of the long member 3. Meanwhile, a mode of guided waves is specified from both of a phase velocity and a group velocity in an embodiment of the present invention, but a mode of guided waves may be specified from any one of the phase velocity and the group velocity.

Here, arguments in the parentheses of each mode are information specifying the mode. In the case of (n,m), n is a degree of a mode in the circumferential direction (½ of the number of nodes of displacement distribution in the circumferential direction), and when n is 0, this represents displacement distribution of axial symmetry. m is an integer equal to or greater than 1 and is an index representing identification of a different mode for the same n (refer to NPL 3).

In the aforementioned conditions, guided waves include two types of waves of the L(0,1) mode and the F(1,1) mode and the wave of the L(0,1) mode is a wave (first signal) used for defect detection. In this case, when the wave (second signal) of the F(1,1) mode is detected by the reception probe 2, the wave becomes noise with respect to a signal of the L(0,1) mode and decreases an SN ratio. Specifically, spatial displacement (vibration) of the L(0,1) mode is axially symmetrical with respect to the central axis of the long member 3 and has only an axial direction component and a radial direction component, and a circumferential direction component is constantly 0. Here, since a defect of the long member 3 is detected using the wave of the L(0,1) mode, the reception probe 2 receives the wave of the L(0,1) mode that has arrived at the position of the reception probe 2 by detecting an axial direction component or a radial direction component (or both the axial direction component and the radial direction component) of vibration in the circumferential surface of the long member 3. Here, when the reception probe 2 receives a component (axial direction component or radial direction component) corresponding to the wave of the F(1,1) in addition to the wave of the L(0,1) mode simultaneously or at a close time, the component becomes noise and decreases an SN ratio.

In general, a vector [u(r, θ, z, t)] representing spatial displacement at a time t of position coordinates (r, θ, z) of an F(n, m) mode (n and m are integers equal to or greater than 1) in the long member 3 is specified by Equation (2).

Formula 2

$$u(r, \theta, z, t) = \begin{pmatrix} u_r(r, \theta, z, t) \\ u_\theta(r, \theta, z, t) \\ u_z(r, \theta, z, t) \end{pmatrix} = \begin{pmatrix} N_{r,nm}(r) \\ N_{\theta,nm}(r) \\ N_{z,nm}(r) \end{pmatrix} e^{i(n\theta + k_{nm}z - \omega t)} + \begin{pmatrix} N_{r,-nm}(r) \\ N_{\theta,-nm}(r) \\ N_{z,-nm}(r) \end{pmatrix} e^{i(-n\theta + k_{nm}z - \omega t)} \quad \text{Equation (2)}$$

$$N_{r,\pm nm}(r), N_{\theta,\pm nm}(r), N_{z,\pm nm}(r):$$

Meanwhile, two terms of ±n in Equation (2) represent two waves of an F(n, m) mode in which rotation in the circumferential direction is in reverse directions (clockwise rotation and counterclockwise rotation) (refer to NPL 3).

As described in the embodiment of the present invention, a case in which the long member 3 has a columnar shape and the transmission probe 1 set on the circumferential surface of the long member 3 applies displacement vibration in the direction parallel to the plane that passes through the position of the transmission probe 1 and the z axis to the vicinity of the circumferential position (a, 0, 0) of the long member 3 is assumed. In this case, a displacement distribution of guided waves generated and transmitted by the transmission probe 1 is in planar symmetry with respect to the plane that passes through the position of the transmission probe 1 and the z axis according to spatial symmetry of the rod shape and the displacement vibration applied by the transmission probe 1 to the long member 3. That is, if the displacement distribution is symmetrical with respect to a radial direction component ($u_r$) and an axial direction component ($u_z$) for the position (θ=0) of the transmission probe 1 with respect to the θ coordinate and antisymmetrical with respect to a circumferential direction component ($u_\theta$), Equation (3) is established.

Formula 3

$$\begin{pmatrix} u_r(r, \theta, z, t) \\ u_\theta(r, \theta, z, t) \\ u_z(r, \theta, z, t) \end{pmatrix} = \begin{pmatrix} u_r(r, -\theta, z, t) \\ -u_\theta(r, -\theta, z, t) \\ u_z(r, -\theta, z, t) \end{pmatrix} \quad \text{Equation (3)}$$

Equation (4) is obtained by applying Equation (2) to Equation (3).

Formula 4

$$\begin{pmatrix} N_{r,nm}(r) \\ N_{\theta,nm}(r) \\ N_{z,nm}(r) \end{pmatrix} = \begin{pmatrix} N_{r,-nm}(r) \\ -N_{\theta,-nm}(r) \\ N_{z,-nm}(r) \end{pmatrix} \quad \text{Equation (4)}$$

Equation (5) is obtained by applying Equation (4) to Equation (2).

Formula 5

$$u(r, \theta, z, t) = \begin{pmatrix} N_{r,nm}(r)e^{in\theta} + N_{r,-nm}(r)e^{-in\theta} \\ N_{\theta,nm}(r)e^{in\theta} + N_{\theta,-nm}(r)e^{-in\theta} \\ N_{z,nm}(r)e^{in\theta} + N_{z,-nm}(r)e^{-in\theta} \end{pmatrix} e^{i(k_{nm}z - \omega t)} = 2\begin{pmatrix} N_{r,nm}(r)\cos n\theta \\ iN_{\theta,nm}(r)\sin n\theta \\ N_{z,nm}(r)\cos n\theta \end{pmatrix} e^{i(k_{nm}z - \omega t)} \quad \text{Equation (5)}$$

Here, since n=1 and m=1 with respect to the F(1,1) mode, Equation (6) is obtained.

Formula 6

$$u(r, \theta, z, t) = \begin{pmatrix} u_r(r, \theta, z, t) \\ u_\theta(r, \theta, z, t) \\ u_z(r, \theta, z, t) \end{pmatrix} = 2\begin{pmatrix} N_{r,11}(r)\cos\theta \\ iN_{\theta,11}(r)\sin\theta \\ N_{z,11}(r)\cos\theta \end{pmatrix} e^{i(k_{11}z - \omega t)} \quad \text{Equation (6)}$$

It is ascertained from Equation (6) that a radius component $u_r$ (r, θ, z, t) and an axial direction component $u_z$ (r, θ, z, t) of displacement are 0 at the position represented by Equation (7) irrespective of the r coordinate, the z coordinate and the time t.

Formula 7

$$\theta = \pm\frac{\pi}{2} \quad \text{Equation (7)}$$

Accordingly, when the reception probe 2 set at a circumferential surface position (a, π/2, L) that satisfies Equation (7) detects displacement in the radial direction or the axial direction near the setting position, as shown in FIG. 1, displacement of the F(1,1) mode is constantly 0 if the detected effective area is significantly small (ideally if it is point contact in the θ direction). Accordingly, the reception probe 2 receives a signal of only the L(0,1) mode and reception of a signal of the F(1,1) mode of which noise is suppressed, and thus the SN ratio can be improved. Further, since both components in the radial direction and the axial direction of displacement of F(1,1) mode are constantly 0 at the position of the reception probe 2 represented by Equation (7), the direction of displacement of guided waves detected by the reception probe 2 may be any direction parallel to the plane that passes through the position of the reception probe 2 and the z axis.

Meanwhile, regarding waves of the F(1,1) mode received by the reception probe 2, the received signal can be suppressed with respect to not only waves transmitted from the transmission probe 1 that have directly arrived at the reception probe 2 but also waves transmitted from the transmission probe 1 in the longitudinal direction (±z direction) of the long member 3 and that have then arrived at the position of the reception probe 2 through processes of reflection, scattering and the like in the same manner as long as the displacement distribution represented by Equation (6) is maintained with respect to guided waves of the F(1,1) mode according to reflection and scattering.

In this manner, spatial displacement of an F(n,m) mode is generally represented by Equation (5), and thus it is possible to suppress a received signal of the F(n,m) mode which is noise by setting the reception probe 2 at the position represented by Equation (8) and detecting spatial displacement in the radial direction or the axial direction.

Formula 8

$$\theta = \frac{1}{n}\left(\frac{\pi}{2} + l\pi\right) \quad \text{Equation (8)}$$

Next, application examples 1 to 4 will be described.

Application Example 1

Figure 4A:
FIG. 4(a) is a cross-sectional view cut perpendicularly to a central axis in the lengthwise direction of a long member.
Figure 4B:
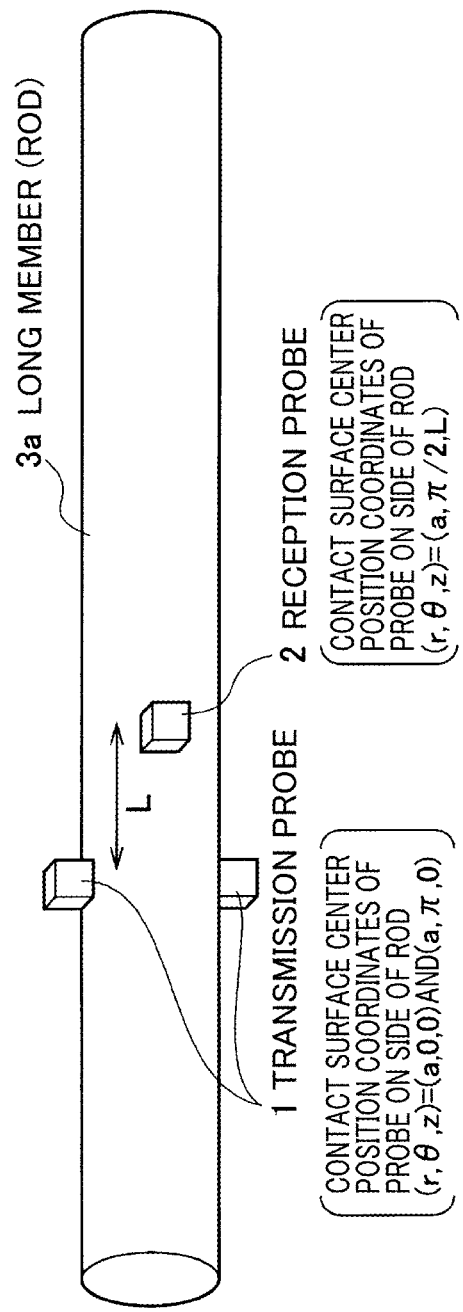
FIG. 4(b) is a perspective view of the long member.

FIG. 4 is a diagram showing that, on the circumferential surface of a long member 3a that is a columnar solid rod made of steel, the transmission probe 1 is disposed at two portions axially symmetrical with respect to the central axis (z axis) of a long member 3a and the reception probe 2 is disposed at a position separated from the transmission probe 1 by a distance L in the axial direction.

The transmission probe 1 includes a plurality of transmission probes (a first transmission probe 1a and a second transmission probe 1b). The first transmission probe 1a and the second transmission probe 1b are arranged in a planar symmetrical positional relation with respect to at least one plane that passes through the central axis (z axis) in the lengthwise direction of the long member 3. Specifically, the two transmission probes are arranged in planar symmetry with respect to the plane that passes through the probe positions and the z axis. The first transmission probe 1a and the second transmission probe 1b are driven to apply displacement or displacement vibration in planar symmetry with respect to this plane to the long member 3. Specifically, the first transmission probe 1a and the second transmission probe 1b apply, to the circumferential surface of the rod, displacement or displacement vibration in a direction parallel to a plane including the positions of the respective transmission probes and the central axis of the long member 3. In other words, the first transmission probe 1a and the second transmission probe 1b apply displacement or displacement vibration in a direction of a vector having a θ component of zero to the circumferential surface of the long member 3. Meanwhile, directions of displacement vibration applied by the two transmission probes may be any separate directions as long as they are directions of vectors having a θ component of zero.

The reception probe 2 is set at a position separated from the transmission probes 1 by the distance L in the axial direction, which is a position at which the θ coordinate differs by n/2 (90) from the θ coordinate of a symmetrical plane that passes through the z axis with respect to displacement applied by the transmission probes 1 to the long member 3.

When setting positions (the centers of grounding surfaces of the transmission probes 1 on the long member 3a) of the first transmission probe 1a and the second transmission probe 1b in the long member 3a are (r, θ, z)=(a, 0, 0) and (a, π, 0), respectively, the setting position (the center of the grounding surface of the reception probe 2 on the long member 3a) of the reception probe 2 in the long member 3a is (r, θ, z)=(a, π/2, L) or (a, −π/2, L).

The first transmission probe 1a and the second transmission probe 1b apply displacement vibration of 60 kHz in a direction in which the θ component is zero (a direction of a vector of which at least one of the r component and the z component is not zero, directions may be different for the transmission probe 1a and the transmission probe 1b) to the circumferential surface of the long member 3a at the setting positions of the transmission probes 1a and 1b. In this case, the displacement vibration applied to the long member 3a is in planar symmetry with respect to the plane that passes through the first transmission probe 1a, the second transmission probe 1b and the center axis (z axis) of the long member 3a. As can be ascertained from the dispersion curves of the phase velocities and the group velocities shown in FIG. 3, 60 kHz guides waves of the L(0,1) mode and the F(1,1) mode are respectively generated from the first transmission probe 1a and the second transmission probe 1b and all the guided waves are transmitted in the longitudinal direction (±z direction) of the long member 3a.

An example in which the L(0,1) mode is used to detect a defect or the like of the long member 3a and the F(1,1) mode is an unnecessary mode (serves as noise) will be described. The transmitted F(1,1) mode satisfies Equation (6) according to the columnar rod shape and spatial symmetry of applied displacement vibration. Accordingly, it is possible to suppress reception of the F(1,1) mode and improve the SN ratio of a received signal of the L(0,1) mode by disposing the reception probe 2 at the position of θ=π/2 as in FIG. 4 and detecting and receiving a radial direction or axial direction component of displacement of (the vicinity of) the position.

In the case of this example, if directions and amplitudes of the displacement vibrations applied by the first transmission probe 1a and the second transmission probe 1b are made to be axially symmetrical with respect to the center axis of the long member 3 in a direction in which the θ component is zero (e.g., displacement vibrations having the same phase and the same amplitude in the z direction or the direction of the radius r), the F(1,1) mode is not generated ideally, and thus the transmission probes 1 can generate and transmit only the L(0,1) mode.

However, if there is a difference between characteristics of the two transmission probes 1 in reality or there is a difference between conditions of setting the transmission probes 1 on the circumferential surface of the long member 3a even when the two transmission probes 1 are driven with the same phase and the same amplitude, there is a case in which differences between displacement vibrations generated by the two transmission probes 1 and an ideal value are generated and thus waves of the F(1,1) mode are also generated and transmitted. Here, a difference between setting conditions may include an error in the positions of the transmission probes 1 and an error in probe directions, a difference between push states of the transmission probes 1, a difference between unevennesses of the circumferential surface of the long member 3a, a difference between states of a contact medium, and the like, for example. In this case, when the generated F(1,1) mode arrives at the reception probe directly or through processes of reflection and scattering, it is detected by the reception probe to generate a signal amplitude. Accordingly, the F(1,1) mode causes noise and decreases the SN ratio.

However, the transmitted F(1,1) mode satisfies Equation (6) according to the columnar rod shape and spatial symmetry of applied displacement vibrations. Accordingly, it is possible to suppress reception of the F(1,1) mode and improve the SN ratio of a received signal of the L(0,1) mode by disposing the reception probe 2 at the position of θ=π/2 as in FIG. 4 and detecting and receiving a radial direction or axial direction component of displacement of (the vicinity of) the position.

Application Example 2

Figure 5A:
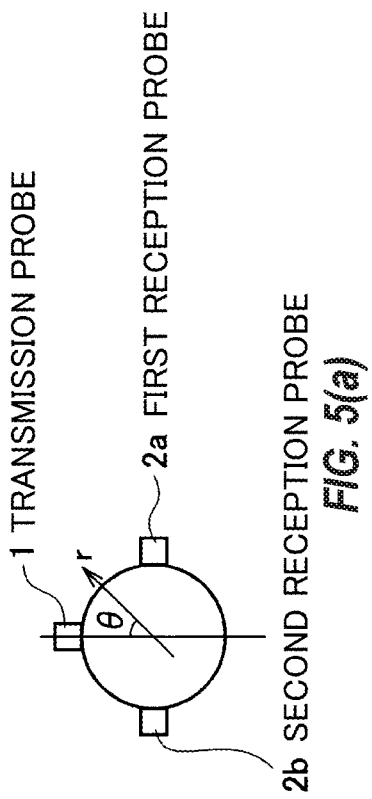
FIG. 5(a) is a cross-sectional view cut perpendicularly to a central axis in the lengthwise direction of a long member.
Figure 5B:
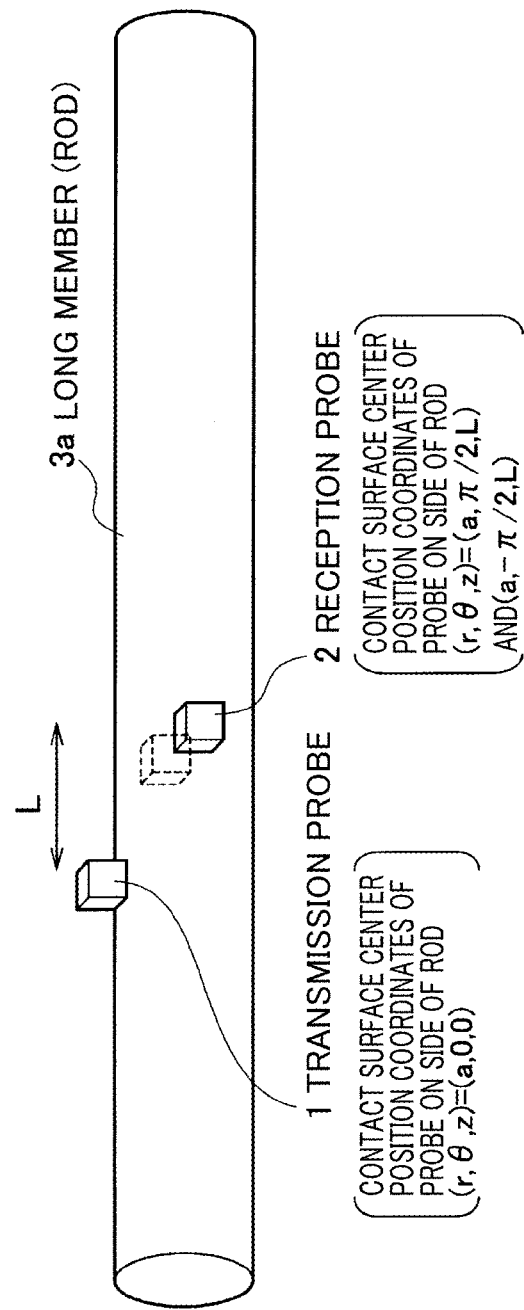
FIG. 5(b) is a perspective view of the long member.

FIG. 5 is a diagram showing that, on the circumferential surface of the long member 3a that is a columnar solid rod made of steel, the transmission probe 1 is arranged and reception probes 2 (a first reception probe 2a and a second reception probe 2b) are arranged at two portions of circumferential positions axially symmetrical with respect to the central axis (z axis) of the long member 3a, which are positions separated from the transmission probe 1 by a distance L in the axial direction. The reception probes 2 are set at positions having a z coordinate difference of L and a θ coordinate difference of ±π/2 (±90°) from those of the position of the transmission probe 1.

When the setting position (the center of the grounding surface of the transmission probe 1 on the long member 3a) of the transmission probe 1 in the long member 3a is (r, θ, z)=(a, 0, 0), the setting positions (the centers of the grounding surfaces of the reception probes 2 on the long member 3a) of the reception probes 2 in the long member 3a are (r, θ, z)=(a, π/2, L) and (a, −π/2, L).

The transmission probe 1 applies displacement vibration of 60 kHz in the axial direction (z direction) or the radial direction (r direction) to the circumferential surface of the long member 3a at the setting position thereof. In this case, as is ascertained from the dispersion curves of the phase velocities and the group velocities shown in FIG. 3, 60 kHz guided waves of the L(0,1) mode and the F(1,1) mode are generated from the transmission probe 1 and transmitted in the longitudinal direction (±z direction) of the long member 3a.

An example in which the L(0,1) mode is used to detect a defect or the like of the long member 3a and the F(1,1) mode is an unnecessary mode (serves as noise) will be described. In the case of this example, the F(1,1) has the displacement distribution represented by Equation (6) according to the shape of the long member 3a and spatial symmetry of the applied displacement vibration. Accordingly, when the two reception probes 2 having the same reception characteristics set at the positions (positions having a θ coordinate difference of π) symmetrical with respect to the central axis of the long member 3a are used, even if the F(1,1) mode is present with respect to received signals according to displacement detection in the axial direction (z direction) or the radial direction (r direction) near the setting positions, it is possible to ideally offset signals of the F(1,1) mode to make them zero by summing the received signals of the two reception probes 2. Specifically, since it is conceived that received signals of the F(1,1) mode according to detection of displacement in a specific direction are proportional to displacement in the direction corresponding to Equation (6), the sum of the received signals of the two reception probes 2 which detect displacement in the radial direction is constantly 0 as represented by Equation (9), for example, when the θ coordinates of the two reception probes 2 are set to θ=α and θ=α+π.

Formula 9

$$2\{N_{r,11}(a)\cos\alpha + N_{r,11}(a)\cos(\alpha+\pi)\}e^{i(k_{11}z-\omega t)} = 0 \quad \text{Equation (9)}$$

As a result, the two reception probes 2 can acquire signals of only the L(0,1) mode having an axially symmetrical displacement distribution.

Here, when there is an individual difference between characteristics of the two reception probes 2 or there is a difference between conditions of setting the reception probes 2 on the circumferential surface of the long member 3a, there is a case in which received signals of the two reception probes 2 have differences with respect to the F(1,1) mode and thus signals of the F(1,1) mode cannot be completely offset even when the received signals are summed, resulting in decrease in the SN ratio. Here, a difference between setting conditions may include an error in the positions of the reception probes 2, an error in probe directions, a difference between push tools of the reception probes 2, a difference between unevennesses of the circumferential surface of the long member 3a, a difference between states of a contact medium, and the like, for example.

However, it is possible to dramatically reduce received signals of the F(1,1) mode and improve the SN ratio by disposing the reception probes 2 at positions of θ=±π/2 at which the amplitude of the F(1,1) mode is constantly 0 and receiving signals, as shown in FIG. 5.

Meanwhile, there may be cases in which received signals of the F(1,1) mode cannot be made to be 0 completely due to an error in the positions of the reception probes 2, an error in probe directions, a difference between unevennesses of the circumferential surface of the long member 3a, a difference between states of a contact medium, and the like even when the reception probes 2 have been set at the positions of θ=±π/2. However, as can be ascertained from Equation (6), displacement of the F(1,1) mode in the radial direction or the axial direction is smaller at positions of (the vicinity of) θ=±π/2 than at positions other than θ=±π/2 in principle. Accordingly, improvement of the SN ratio can be expected by setting the reception probes 2 at the positions of θ=±π/2 as compared to cases in which they are set at other positions.

Application Example 3

In application example 3, a case in which, on the circumferential surface of the long member 3a, the transmission probe 1 is arranged and two reception probes 2 (the first reception probe 2a and the second reception probe 2b) are arranged at two portions of circumferential positions axially symmetrical with respect to the central axis (z axis) of the long member 3a, which are positions separated from the transmission probe 1 by a distance L in the axial direction as in the configuration shown in FIG. 5 will be described. Although a case in which the transmission probe 1 generates 60 kHz guided waves of the L(0,1) mode and the F(1,1) mode has been described in application example 2, a case in which the transmission probe 1 generates three types of 200 kHz guided waves of the L(0,1) mode, the F(1,1) mode and an F(1,2) mode by applying 200 kHz displacement vibration in the z direction to the surface of the member is described in application example 3.

An example in which the L(0,1) mode is used to detect a defect or the like of the long member 3a and the F(1,1) mode and the F(1,2) mode are unnecessary modes (serve as noise) will be described. Transmitted F mode displacement distributions have the displacement distribution represented by Equation (6) with respect to the F (1, 1) mode and has the displacement distribution represented by Equation (10) with respect to the F(1,2) mode according to the shape of the long member 3a and spatial symmetry of the displacement vibration applied to the long member 3a.

Formula 10

$$u(r, \theta, z, t) = \begin{pmatrix} u_r(r, \theta, z, t) \\ u_\theta(r, \theta, z, t) \\ u_z(r, \theta, z, t) \end{pmatrix} = 2 \begin{pmatrix} N_{r,12}(r)\cos\theta \\ iN_{\theta,12}(r)\sin\theta \\ N_{z,12}(r)\cos\theta \end{pmatrix} e^{i(k_{12}z-\omega t)} \quad \text{Equation (10)}$$

As can be ascertained from Equation (6) and Equation (10), the sign of displacement distributions of the F(1,1)

mode and the F(1,2) mode in the axial direction (z direction) or the radial direction (r direction) is inverted for change in n of θ. Accordingly, when the two reception probes 2 having the same reception characteristics are set at positions (positions having a θ coordinate difference of π) symmetrical with respect to the central axis of the long member 3a, it is possible to ideally offset signals of each F mode to make them zero by summing received signals in detection of displacement in the axial direction (z direction) or the radial direction (r direction). As a result, it is possible to acquire only signals of the L(0,1) mode having an axially symmetrical displacement distribution if the two reception probes 2 are used.

Here, when there is an individual difference between characteristics of the two reception probes 2 or there is a difference between conditions of setting the reception probes 2 on the circumferential surface of the long member 3a, there is a case in which amplitudes and phases of received signals of the two reception probes 2 with respect to the F(1,1) mode and the F(1,2) mode have differences from ideal values and thus signals of the two F modes cannot be completely offset even when the received signals are summed, resulting in decrease in the SN ratio. Here, a difference between setting conditions may include an error in the positions of the reception probes 2, an error in probe directions, a difference between push tools of the reception probes 2, a difference between unevennesses of the circumferential surface of the long member 3a, a difference between states of a contact medium, and the like, for example.

However, it is possible to dramatically reduce received signals of the F(1,1) mode and the F(1,2) mode and improve the SN ratio by disposing the reception probes 2 at positions of θ=±π/2 at which the amplitudes of the F(1,1) mode and the F(1,2) mode are constantly 0 and receiving signals, as shown in FIG. 5.

Meanwhile, there may be cases in which received signals of the F(1,1) mode and the F(1,2) mode cannot be made to be 0 completely due to an error in the positions of the reception probes 2, an error in probe directions, a difference between unevennesses of the circumferential surface of the long member 3a, a difference between states of a contact medium, and the like even when the reception probes 2 have been set at the positions of θ=±π/2. However, as can be ascertained from Equation (6) and Equation (10), displacements of the F(1,1) mode and the F(1,2) mode in the radial direction or the axial direction are smaller at positions of (the vicinity of) θ=±π/2 than at positions other than θ=±π/2 in principle. Accordingly, improvement of the SN ratio can be expected by setting the reception probes 2 at the positions of θ=±π/2 as compared to cases in which they are set at other positions.

Application Example 4

Figure 6A:
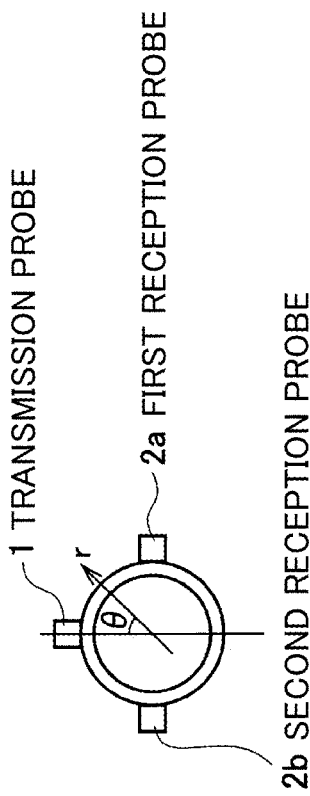
FIG. 6(a) is a cross-sectional view cut perpendicularly to a central axis in the lengthwise direction of a long member.
Figure 6B:
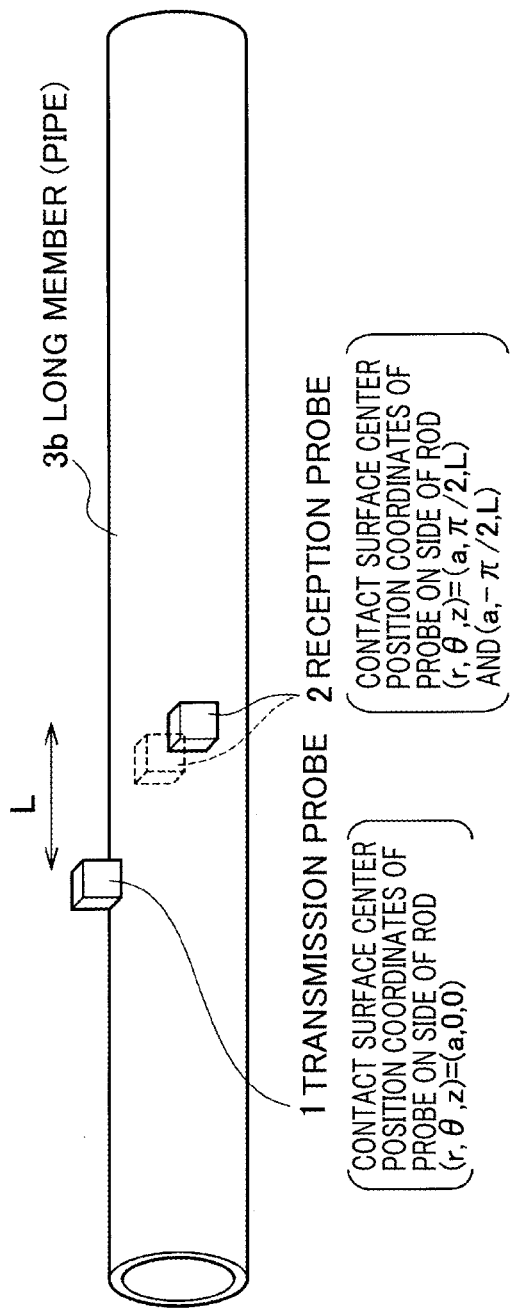
FIG. 6(b) is a perspective view of the long member.

FIG. 6 is a diagram showing that, on the circumferential surface (outer circumferential surface) of a long member 3b that is a cylindrical pipe made of steel, the transmission probe 1 is arranged and two reception probes 2 (the first reception probe 2a and the second reception probe 2b) are arranged at two portions symmetrical with respect to the central axis of the long member 3b, which are positions separated from the transmission probe 1 by a distance L in the axial direction. Although the setting positions of the transmission probe 1 and the reception probes 2 shown in FIG. 6 are the same as those in FIG. 5, the long member 3a in FIG. 5 is a columnar solid rod whereas the long member 3b in FIG. 6 is a cylindrical pipe.

Figure 7:
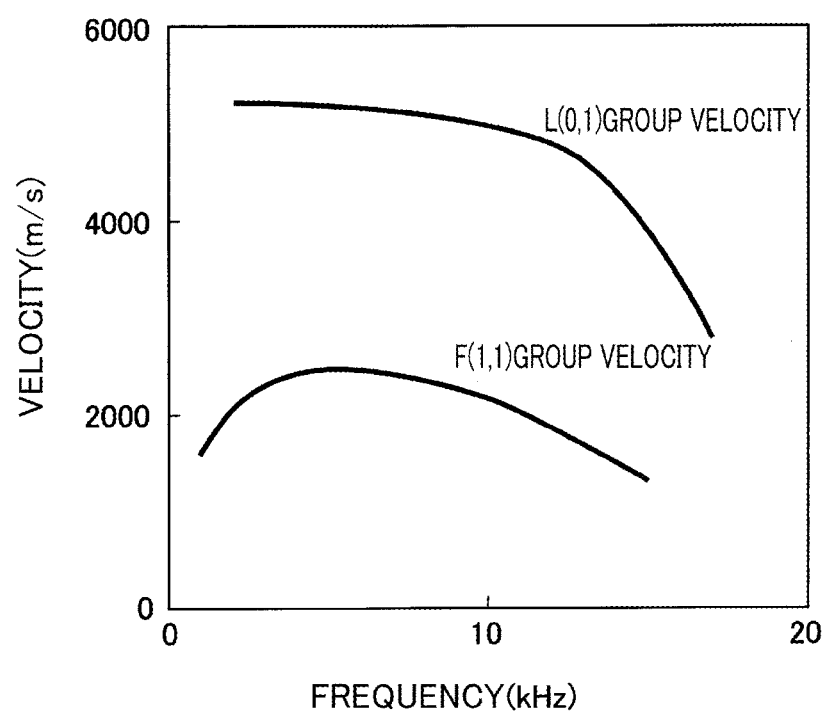
FIG. 7 is a diagram describing dispersion curves of group velocities of an F mode and an L mode of guided waves with respect to a predetermined long member.

FIG. 7 shows dispersion curves of group velocities of guided wave L(0,1) mode and F(1,1) mode in a cylindrical pipe made of steel having an outer diameter of 87 mm and an inner diameter of 76 mm in the vacuum. When the pipe of FIG. 6 is a cylindrical pipe made of steel having an outer diameter of 87 mm (a=43.5 mm) and an inner diameter of 76 mm, as can be ascertained from the group velocity dispersion curves of FIG. 7, 10 kHz guided waves of the L(0,1) mode and the F(1,1) mode are generated and transmitted in the longitudinal direction (±z direction) of the long member 3b when the transmission probe 1 applies 10 kHz displacement vibration to the circumferential surface of the long member 3b at the setting position thereof in the axial direction (z direction).

An example in which the L(0,1) mode is used to detect a defect or the like of the long member 3b and F(1,1) mode is an unnecessary mode (serves as noise) will be described. In the case of this example, the F(1,1) mode transmitted by the transmission probe 1 has the displacement distribution represented by Equation (6) inside the pipe (38 mm≤r≤43.5 mm) according to the shape of the long member 3b and spatial symmetry of displacement vibration applied by the transmission probe 1 to the circumferential surface of the pipe. Accordingly, when the two reception probes 2 having the same reception characteristics set at the positions (positions having a θ coordinate difference of π) axially symmetrical with respect to the central axis of the long member 3b can ideally offset signals of the F(1,1) mode to make them zero by summing received signals thereof even if F(1,1) mode is present with respect to received signals according to displacement detection in the axial direction (z direction) or the radial direction (r direction) near the setting positions. Specifically, since it is conceived that received signals of the F(1,1) mode according to detection of displacement in a specific direction are proportional to displacement in the direction corresponding to Equation (6), the sum of the received signals of the two reception probes which detect displacement in the radial direction is constantly 0 as represented by Equation (9), for example, when the θ coordinates of the two reception probes 2 are set to θ=α and θ=α+π.

As a result, the two reception probes 2 can acquire signals of only the L(0,1) mode having an axially symmetrical displacement distribution.

Here, when there is an individual difference between characteristics of the two reception probes 2 or there is a difference between conditions of setting the reception probes 2 on the circumferential surface of the long member 3a, there is a case in which amplitudes and phases of received signals with respect to the F(1,1) mode have differences from ideal values and thus signals of both the two reception probes 2 cannot be completely offset even when the two reception probes 2 are set at positions having only a θ coordinate difference of π therebetween, resulting in decrease in the SN ratio.

Here, a difference between setting conditions may include an error in the positions of the reception probes 2, an error in directions, a difference between push tools of the reception probes 2, a difference between unevennesses of the circumferential surface of the long member 3b, a difference between states of a contact medium, and the like, for example.

However, it is possible to dramatically reduce received signals of the F(1,1) mode and improve the SN ratio by disposing the reception probes 2 at positions of θ=±π/2 at which displacement of the F(1,1) mode in the radial direction and the axial direction is constantly 0 and receiving signals, as shown in FIG. 6.

First Modified Example

Although cases in which the long member 3 is a columnar sold rod, a cylindrical pipe, and the like formed in such a manner that they are axially symmetrical with respect to the central axes in the lengthwise direction and a plurality of cross sections formed perpendicular to the central axes have the same shape have been described in the embodiment of the present invention, the present invention is not limited thereto. It is desirable that the long member 3 be formed such that displacement of a specific component of guided waves serving as the second signal becomes zero at a specific circumferential surface position.

Second Modified Example

Although a case in which the first signal (desired signal) used to detect a defect such as change in material properties is an L mode having no node in the θ direction and the second signal (noise) is an F mode having nodes in the θ direction has been described in the embodiment of the present invention, a case in which the first signal is an F mode having nodes in the θ direction is described in the second modified example.

It is possible to improve the SN ratio by setting and driving the transmission probe 1 and setting the reception probe 2 such that a position at which displacement of an F mode serving as noise is constantly zero matches a position at which displacement of a desired F mode has an amplitude that is not zero. Here, the number of nodes of displacement of the desired F mode in the circumferential surface direction differs from the number of nodes of displacement of the F mode serving as noise in the circumferential surface direction.

Other Embodiments

Although described according to the embodiment of the present invention and modified examples 1 and 2 thereof as above, it should not be understood that description and figures constituting a part of this disclosure limit the present invention. Those skilled in the art can ascertain various substitute embodiments, examples and operation technologies from this disclosure.

The present invention includes various embodiments and the like that are not described here. Therefore, the technical scope of the present invention is determined only by specific matters of the invention according to the claims which are valid from the above description.

REFERENCE SIGNS LIST

1 Transmission probe
2 Reception probe
3 Long member

The invention claimed is:

1. A probe setting method for setting, on a long member, a transmission probe for transmitting guided waves propagating in the longitudinal direction of the long member and a reception probe for receiving guided waves derived from the guided waves reflected from a predetermined portion of the long member, wherein the guided waves received by the reception probe include a guided wave serving as a desired first signal and a guided wave serving as a second signal that is noise of the first signal, the guided wave serving as the second signal having nodes in a circumferential direction distribution of displacement in a specific direction in the circumferential surface of the long member, and the guided waves transmitted by the transmission probe are formed such that the displacement of the guided wave serving as the second signal in the specific direction becomes zero at a specific circumferential surface position of the long member, the probe setting method comprising:

a step of setting the transmission probe for transmitting the guided waves on the circumferential surface of the long member; and a step of setting the reception probe at a position at which the displacement of the guided wave serving as the second signal in the specific direction becomes zero on the circumferential surface of the long member.

2. The probe setting method according to claim 1, wherein the transmission probe applies, to the circumferential surface of the long member, displacement or displacement vibration in a direction parallel to a plane including the position of the transmission probe and the central axis of the long member.

3. The probe setting method according to claim 1, wherein the long member is formed to be axially symmetrical with respect to the central axis in the lengthwise direction and has a plurality of cross sections formed perpendicularly to the central axis and having the same shape.

4. The probe setting method according to claim 1, wherein the reception probe is set at the specific circumferential surface position at which the displacement of the guided wave serving as the second signal in the specific direction becomes zero, and the specific direction is a direction parallel to a plane passing through the specific circumferential surface position and the central axis of the long member.

5. The probe setting method according to claim 1, wherein an angle θ formed by a straight line that passes through the position at which the transmission probe is set and perpendicularly intersects the central axis of the long member in the lengthwise direction and a straight line that passes through the position at which the reception probe is set and perpendicularly intersects the central axis of the long member is specified by Equation (1).

[Formula 1]

$$\theta = \frac{1}{n}\left(\frac{\pi}{2} + l\pi\right) \quad \text{Equation (1)}$$

n: integer equal or greater than 1 and corresponding to ½ of the number of nodes of circumferencial direction distribution of
displacement of the second wave
l: integer.

6. The probe setting method according to claim 1, wherein the transmission probe includes a plurality of probes, the plurality of probes are disposed in a planar symmetrical positional relation with respect to at least one plane passing through the central axis of the long member in the lengthwise direction, and the plurality of transmission probes are driven to apply displacement or displacement vibration in planar symmetry with respect to the plane to the long member.

7. A method for driving a transmission probe set on the circumferential surface of a long member, wherein a transmission probe for transmitting guided waves propagating in the longitudinal direction of the long member and a reception probe for receiving guided waves derived from the guided waves reflected from a predetermined portion of the long member are set on the circumferential surface of the long member, the guided waves received by the reception probe include a guided wave serving as a desired first signal and a guided wave serving as a second signal that is noise of the first signal, the guided wave serving as the second signal having nodes in a circumferential direction distribution of displacement in a specific direction in the circumferential surface of the long member, the guided waves transmitted by the transmission probe are formed such that the displacement of the guided wave serving as the second signal in the specific direction becomes zero at a specific circumferential surface position of the long member, and the reception probe is set at a position at which the displacement of the guided wave serving as the second signal in the specific direction becomes zero on the circumferential surface of the long member, the method for driving a transmission probe comprising: a step of driving the transmission probe such that the transmission probe applies, to the circumferential surface of the long member, displacement or displacement vibration in a direction parallel to a plane including the position of the transmission probe and the central axis of the long member.

8. A method for driving a transmission probe set on the circumferential surface of a long member, wherein a transmission probe for transmitting guided waves propagating in the longitudinal direction of the long member and a reception probe for receiving guided waves derived from the guided waves reflected from a predetermined portion of the long member are set on the circumferential surface of the long member, the guided waves received by the reception probe include a guided wave serving as a desired first signal and a guided wave serving as a second signal that is noise of the first signal, the guided wave serving as the second signal having nodes in a circumferential direction distribution of displacement in a specific direction in the circumferential surface of the long member, the guided waves transmitted by the transmission probe are formed such that the displacement of the guided wave serving as the second signal in the specific direction becomes zero at a specific circumferential surface position of the long member, the transmission probe includes a plurality of probes, the plurality of probes being disposed in a planar symmetrical positional relation with respect to at least one plane passing through the central axis of the long member in the lengthwise direction, and the reception probe is set at a position at which the displacement of the guided wave serving as the second signal in the specific direction becomes zero on the circumferential surface of the long member, the method for driving the transmission probe comprising: a step of driving the plurality of transmission probes such that the transmission probes apply displacement or displacement vibration in planar symmetry with respect to the plane to the long member.

* * * * *